(12) United States Patent
Matsui et al.

(10) Patent No.: US 7,051,027 B2
(45) Date of Patent: May 23, 2006

(54) INFORMATION SERVICE SYSTEM, INFORMATION SERVICE PARTICIPATION MANAGEMENT APPARATUS, INFORMATION SERVICE PROVIDING APPARATUS, AND RECORDING MEDIUM

(75) Inventors: Kazuki Matsui, Kawasaki (JP); Hiroyasu Sugano, Kawasaki (JP); Madoka Mitsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 914 days.

(21) Appl. No.: 09/106,896

(22) Filed: Jun. 30, 1998

(65) Prior Publication Data

US 2001/0011273 A1 Aug. 2, 2001

(30) Foreign Application Priority Data

Sep. 22, 1997 (JP) .................................. 9-257328

(51) Int. Cl.
*G06F 17/30* (2006.01)
(52) U.S. Cl. .................. 707/9; 707/1; 707/10; 709/229
(58) Field of Classification Search .............. 707/1–10, 707/100–104.1, 200–206; 705/5, 9, 14, 37; 713/200–202; 709/217, 219, 225, 229
See application file for complete search history.

(56) References Cited

U.S. PATENT DOCUMENTS 5,696,898 A * 12/1997 Baker et al. ................ 713/201
5,765,153 A * 6/1998 Benantar et al. ............... 707/9
5,813,006 A * 9/1998 Polnerow et al. ............. 707/10
5,918,222 A * 6/1999 Fukui et al. ................... 707/1
5,941,947 A * 8/1999 Brown et al. ............... 709/225

* cited by examiner

*Primary Examiner*—Shahid Alam
*Assistant Examiner*—Jean Bolte Fleurantin
(74) *Attorney, Agent, or Firm*—Staas & Halsey LLP

(57) ABSTRACT

An information service system, information service participation management apparatus, information service providing apparatus, and recording medium which are designed to collectively manage identification information once acquired by a participant by the information service participation management apparatus, to once permit the participant who newly requests participation in the information service by the identification information to participate provisionally with the participant's behavior being recorded for a certain period, to permit/reject official participation depending on the evaluation of the recorded result, to record a history that the participant to whom the identification information has been issued is permitted or rejected participate in which information service, to report the historical information in response to an inquiry from the information service providing apparatus, and further to record a history of the participant to whom the identification information has been issued that in which information service the participant is permitted or rejected to participate so as to publicize the participation history information to other participants.

19 Claims, 17 Drawing Sheets

FIG. 8A
SERVICE HISTORY

| RECORD No. | SERVICE NAME | RECORDER | RECORDING DATE&TIME | RECORDED CONTENTS |
|---|---|---|---|---|
| 1 | CHAT#CHANEL1 | Foo@aaaa.co.jp | 1997/05/29 13:00 | JOIN ACCEPTED |
| 2 | NEWS#NG1 | Bar@aaaa.co.jp | 1997/09/30 8:00 | JOIN DENIED |
| .. | .. | .. | .. | .. |

FIG. 8B
ACCESS PERMISSION TABLE

| PUBLICATION CONTENTS | PUBLICATION PERMITTED TARGET |
|---|---|
| SERVICE NAME & RECORDED CONTENTS | ID1, ID5, ID10 |
| RECORDER | ALL |

FIG. 9A
PARTICIPANT RELATION LIST

| ID | ACQUAINTED SITE | ELECTRONIC CALLING CARD EXCHANGE DATE&TIME |
|---|---|---|
| ABC0123 | irc.aaaa.co.jp:8000, #CHANEL1 | 1997/05/29 13:00 |
| DEF4567 | News.aaaa.co.jp:9000, #NG1 | 1997/09/30 8:00 |

FIG. 9B
ACCESS PERMISSION TABLE

| PUBLICATION CONTENTS | PUBLICATION PERMITTED TARGET |
|---|---|
| ABC0123 | ID1, ID5, ID10 |
| DEF4567 | ALL | ion service system is lost. However, in the past, there has not
INFORMATION SERVICE SYSTEM, INFORMATION SERVICE PARTICIPATION MANAGEMENT APPARATUS, INFORMATION SERVICE PROVIDING APPARATUS, AND RECORDING MEDIUM

BACKGROUND OF THE INVENTION

1. Field of Invention

The present invention relates to an information service system for providing an information service utilizing the computer network such as BBS (Bulletin Board System), chat system, etc., information service participation management apparatus which gives an ID to the participant of the information service, information service providing apparatus for offering an information service to the permitted participants, and a recording medium in which a computer program for deciding permission/rejection of participation in the information service based on a record of the past behavior of the participant in the information service, or a computer program for publicizing to other participants the record of the participant's past behavior and companionship relation in the information service is recorded.

2. Description of the Related Art

FIG. 1 is a block diagram of the conventional information service system.

A service server 10 provides an information service to a client 30 through which a participant requests participation in the BBS, chat system, etc. when the participation is permitted. The participant registers the ID in the service server 10, and on each occasion of participation in the information service, transmits the registered ID and password to the service server 10 to make a request for participation in the information service. The participant registers its ID in every service server 10 in which one desires to participate.

The service server 10 stores the registered ID in an ID data base 101, and when it receives a request for participation in the information service from the client 30, it checks whether the ID transmitted from the client 30 is registered in the ID data base 101 or not, and in case the ID is registered, it judges righteousness of the password. As a result, if the ID is registered and the password is right, the service server 10 notifies the client 30 of permission to participate, and in case the password is wrong or the ID is unregistered, it notifies the client 30 of rejection of participation.

Due to the popularity of the Internet, there have been increased opportunities for utilizing the information services through the computer network. In case of registering an ID on the service server, the participant reports personal information such as the address, name, electronic mail address, the credit card number, if necessary, and the like. Such personal information is in danger of being stolen by an intrusion into the network or leaked outside from the service server and used for an evil purpose.

However, according to the conventional information service system as mentioned above, because the participant is required to register the ID in each service server, there are increased occasions for the personal information to be leaked outside, and higher risks for being unjustly utilized. In addition, the work of user registration is complicated.

Furthermore, in such an information service system, the participant who has used for example discriminative words or taken undesirable behaviors such as to blame or speak ill of other participants, is not known to known by other information service systems. Such a participant, if similarly taking undesirable behaviors, would give other participants uncomfortable feelings, and reliability of the information service system is lost. However, in the past, there has not been any means to judge the reliability of the participant under some criterion so as to prevent an unreliable participant from participating.

Furthermore, in the information service which aims at making communication with other participants such as BBS, chat system, etc., anonymous participation is admitted. The participant can join the communication in any name or using freely a plurality of anonymities. Accordingly, the participant is unable to judge the reliability of others, and it becomes difficult to realize communication.

BRIEF SUMMARY OF THE INVENTION

The present invention has been made to settle the problems as mentioned above. It is an object of the invention to provide an information service system, information service participation management apparatus, information service providing apparatus, and recording medium to collectively manage identification information once acquired by a participant by the information service participation management apparatus, to once permit the participant who newly requests participation in the information service by the identification information to participate provisionally with the participant's behavior being recorded for a certain period, and depending on the evaluation on the recording result, to permit/reject official participation. Thus the participant side is able to conceal the personal information to eliminate anxiety about leakage of the personal information outside, and it is also unnecessary to obtain the identification information from each information service providing apparatus. Further, the information service providing side is able to judge the participant's reliability at the time of participation in the information service, and to reject participation of the unreliable participant.

It is another object of the present invention to provide an information service system, information service participation management apparatus, information service providing apparatus, and recording medium in which it is possible to judge the participant's reliability at the time of participation in the information service, and to exclude participation of the unreliable participant by recording the history of the participant to whom the identification information has been issued that in which information service the participant is allowed or rejected to participate, and reporting the history information in response to the inquiry from the information service providing apparatus.

It is still another object of the present invention to provide an information service system, information service participation management apparatus, information service providing apparatus, and recording medium in which the participants are able to mutually judge the other's reliability to expect smooth communication, by recording the history of the participant to whom the identification information has been issued that in which information service the participant is allowed or rejected to participate so as to publicize the participation history information to other participants, and by recording information showing companionship relations of the participants to whom the identification information is issued so as to publicize the information on the companionship relation to other participants.

In the present invention, the identification information once acquired by the participant is collectively managed by the information service participation control apparatus, the participant who newly requests participation in the information service by this identification information is allowed to participate provisionally, its behaviors are recorded for a predetermined period, and the official participation is allowed/rejected depending on the evaluation of the recorded results.

Accordingly, it becomes possible for the participant side to conceal the personal information and to eliminate anxiety about leakage of the personal information outside, and it becomes unnecessary to acquire identification information from each information service providing apparatus. On the information service providing side, it becomes possible to judge the reliability of the participant at the time of its participation in the information service, and to exclude the unreliable participant from participation.

In the present invention, the history of the participant to whom the identification information has been issued is recorded that which information service the participant is allowed or rejected to participate, and the history information is reported in response to the inquiry from the information service providing apparatus.

Accordingly, it becomes possible to judge the reliability of the participant at the time of its participation in the information service, and to exclude the unreliable participant from participation.

In the present invention, there is recorded the history of the participant to whom the identification information has been issued that to which information service the participant is allowed or rejected to participate, and the participation history information is publicized to other participants. Also, the information showing the companionship relations between the participants to whom the identification information is issued is recorded, and the information on the companionship relation is publicized to other participants.

Accordingly, the participants can mutually judge the other's reliability and expect the smooth communication.

In the present invention, it becomes possible to limit the scope of publicizing the participation history information or companionship relation information.

The above and further objects and features of the invention will more fully be apparent from the following detailed description with accompanying drawings.

BRIEF DESCRIPTION OF THE SEVERAL VIEWS OF THE DRAWING

FIGS. 8A and 8B are conceptual views showing the service history and access permission table;

FIGS. 9A and 9B are conceptual views showing the participant relation list and access permission table;

DETAILED DESCRIPTION OF THE INVENTION

Embodiment 1

Phased participation in service

Figure 1:
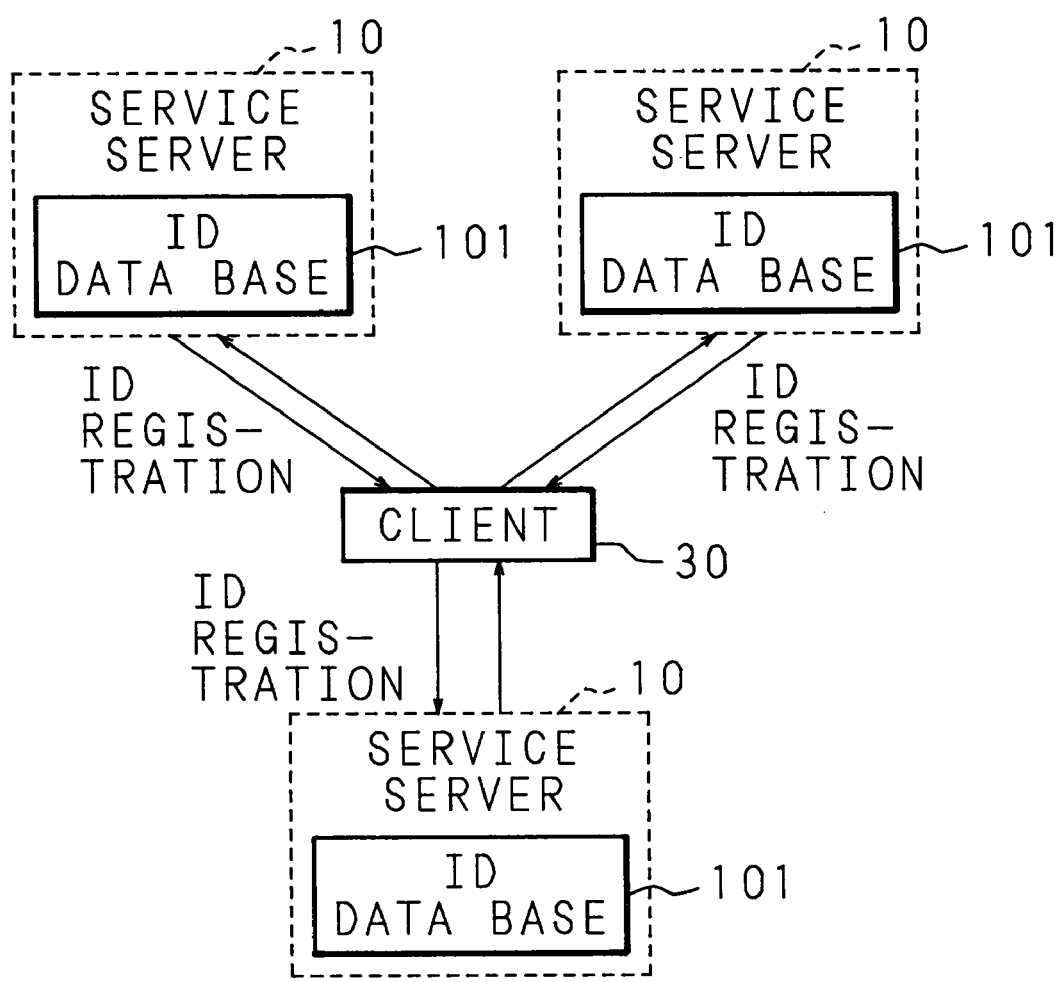
FIG. 1 is a block diagram of a conventional information service system.
Figure 2:
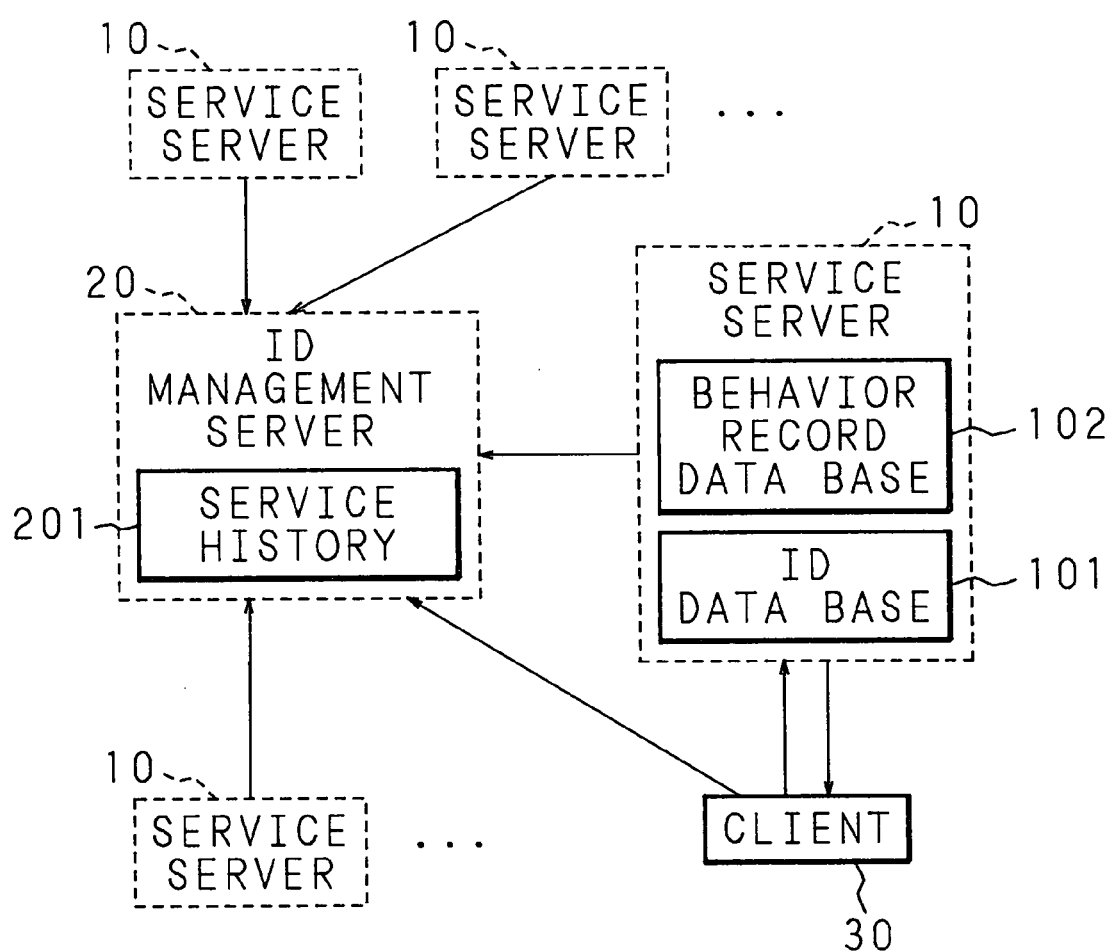
FIG. 2 is a block diagram of Embodiment 1 of the invention.

FIG. 2 is a block diagram of Embodiment 1 of an information service system of the present invention. In the drawing, numeral 10 denotes a service server for providing services such as electronic Bulletin Board, chat, etc. to a client 30 on a computer network such as the Internet.

Each service server 10 is furnished with an ID data base 101 for storing IDs of permitting participants to participate in the service and a behavior record data base 102 for recording the behaviors of the participant who is allowed provisional participation, which is the preceding step to official participation. For example, in the case of a client server, for recording the number of utterances, number of times of using discriminative words, number of slanders against or aspersions on others, etc.

An ID management server 20 issues an ID in response to a request from the client 30 and records the history information that in which service server 10 the participant has been allowed or rejected to participate in a service history 201 [see FIG. 7A] based upon to the participant's ID.

The participant declares his or her name, address, electronic mail address, etc. to the ID management server 20, and participates in the service of the service server 10 by the ID issued by the ID management server 20.

Figure 10A:
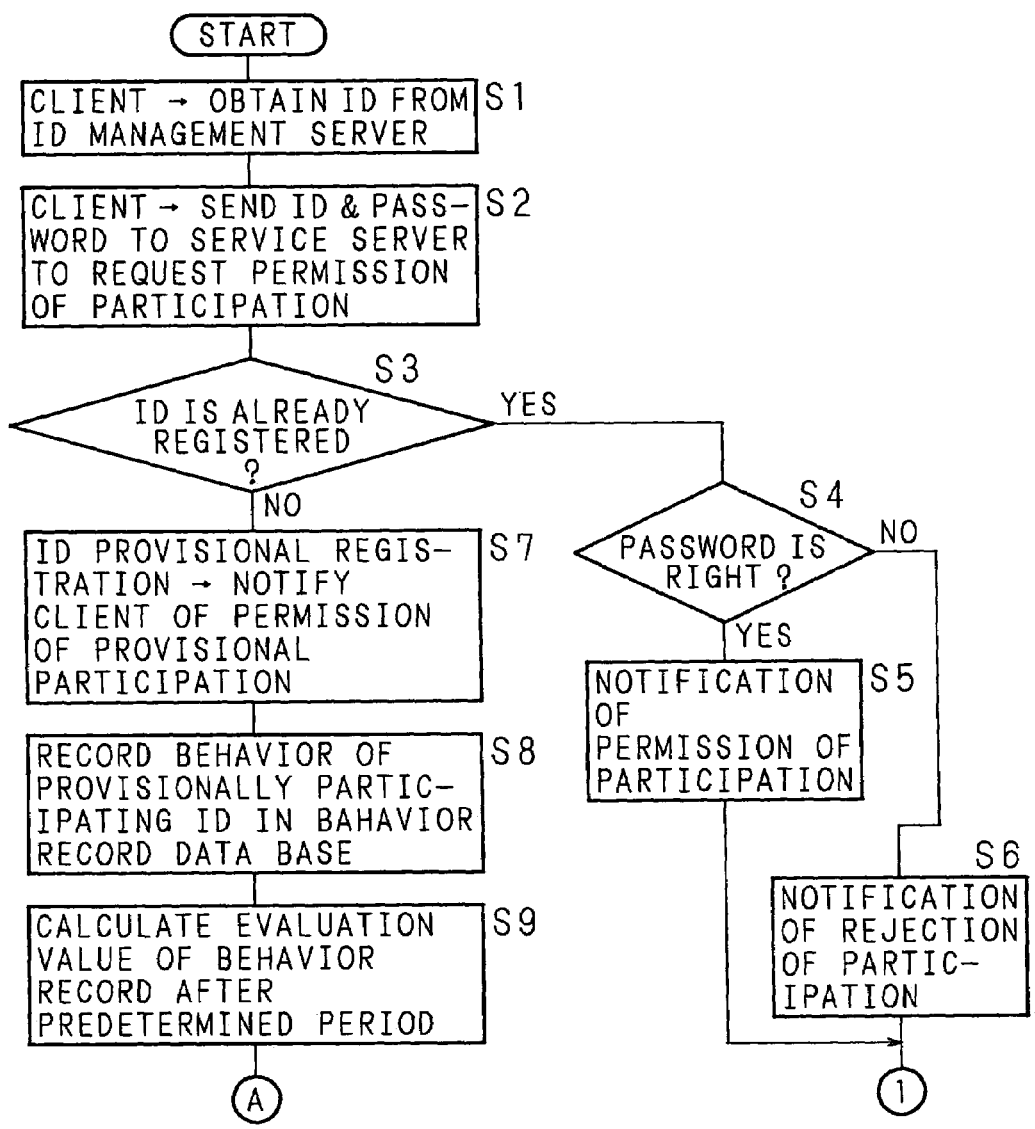
FIGS. 10A and 10B are flow charts showing the procedures in Embodiment 1.
Figure 10B:
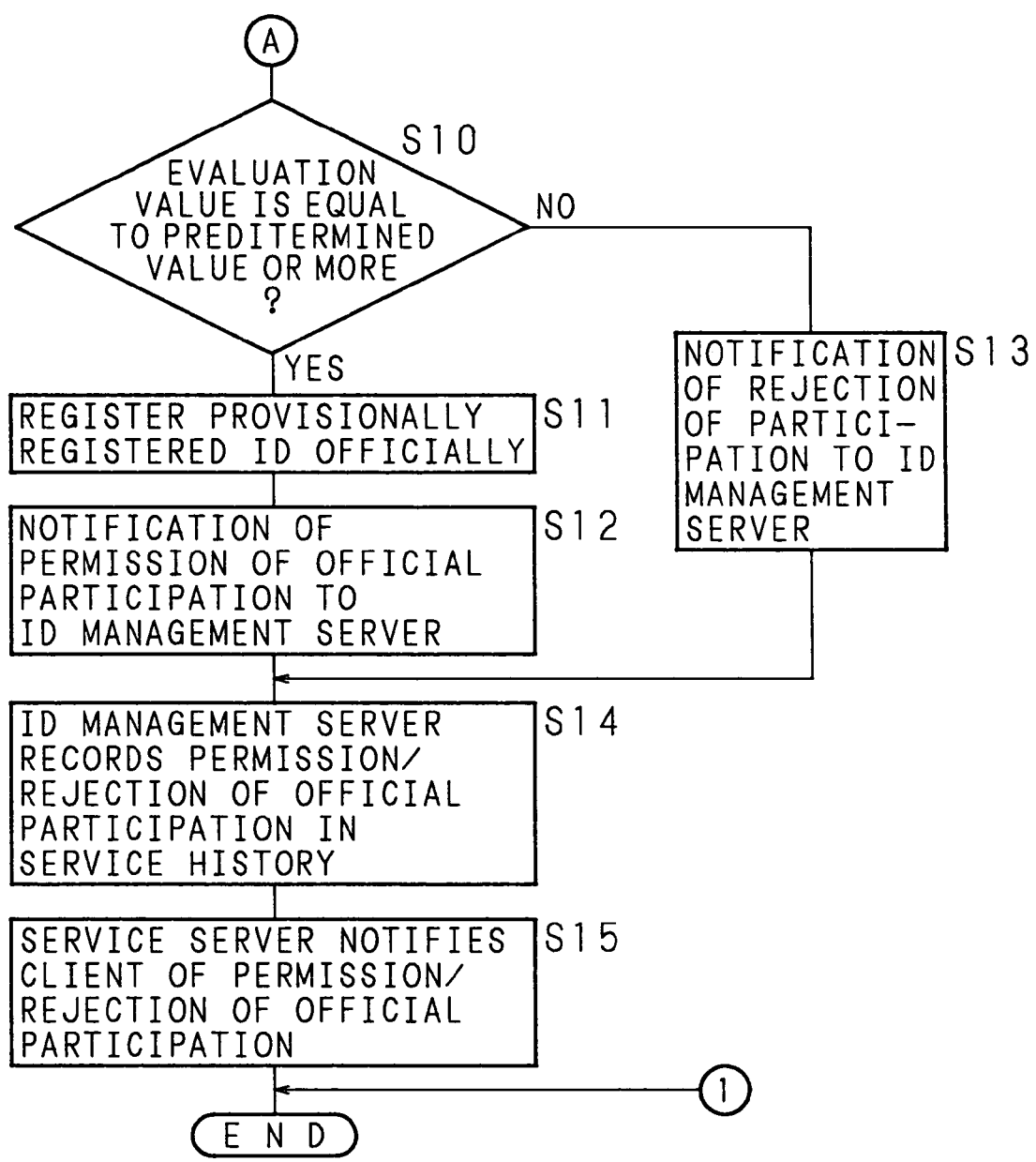

The procedures in Embodiment 1 are explained on the basis of the flow charts of FIGS. 10A and 10B. In this embodiment, the service server 10 is a chat server, and the client 30 is a chat client. The chat server realizes simultaneous conversations among plural participants by transmitting character data to the chat clients in real time.

The participant declares to the ID management server 20 through the client 30 the address, name, electronic mail address, etc. and obtains an ID from the ID management server 20 beforehand (Step S1).

The participant sends the ID and password to the service server 10 through the client 30 to request permission for participation (Step S2). The service server 10 judges whether the ID sent from the client 30 is already registered or not (Step S3), and in case of it being already registered, it judges whether the password is right or not (Step S4). If the password is right, it notifies the client 30 of permission to participate (Step S5), while on the contrary if the password is wrong, it notifies the client 30 of rejection of participation (Step S6) to complete the procedures for permission/rejection of participation.

In case the ID is not registered in the ID data base 101, the ID is provisionally registered in the ID data base 101, and the client 30 is notified of permission of provisional participation (Step S7). The service server 10 records the behavior of the ID during the provisional participation in the behavior record data base 102 (Step S8). The behaviors to be recorded are, for example, the number of utterances, number of times of using taboo words such as discriminative words, etc.

The behaviors of the participant during the provisional participation are recorded for a predetermined period, for example, one week, after which the evaluation value of the behavior record is calculated (Step S9). The number of utterances is set to be an evaluation function F1, the number of times of using taboo words to be an evaluation function F2. The evaluation function F1 becomes "1" when the number of utterances comes up to the predetermined value of for example 10 times, and "−1" when the number does not come up to the above level. The evaluation function F2 is "−1" when the number of times of using taboo words comes up to the predetermined value (for example one time), and "1" in other cases. Thus, when the evaluation value of V=F1+F2 is equal to or larger than "0" (predetermined value), the ID which is provisionally registered in the ID data base 101 is officially registered (Sep S11), and the permission on the official participation of this ID is notified to the ID management server 20 (Step S12). On the other hand, in case the evaluation value V is minus, rejection to participation of this ID is notified to the ID management server 20 (Step S13).

The ID management server 20 records the information on permission/rejection of the official participation of the ID notified from the service server 10 in the service history 201 (Step S14).

Further, the service server 10 notifies the client 30 of the official participation permission/rejection (Step S15).

As described above, because the information service providing side judges the reliability of the participant to decide permission/rejection of participation in the information service, the participant need not publicize the personal information such as an address, name, electronic mail address, etc. to certify own reliability at the time of the initial participation in the information service.

Embodiment 2

Reference to Service History in Other Service

Figure 3:
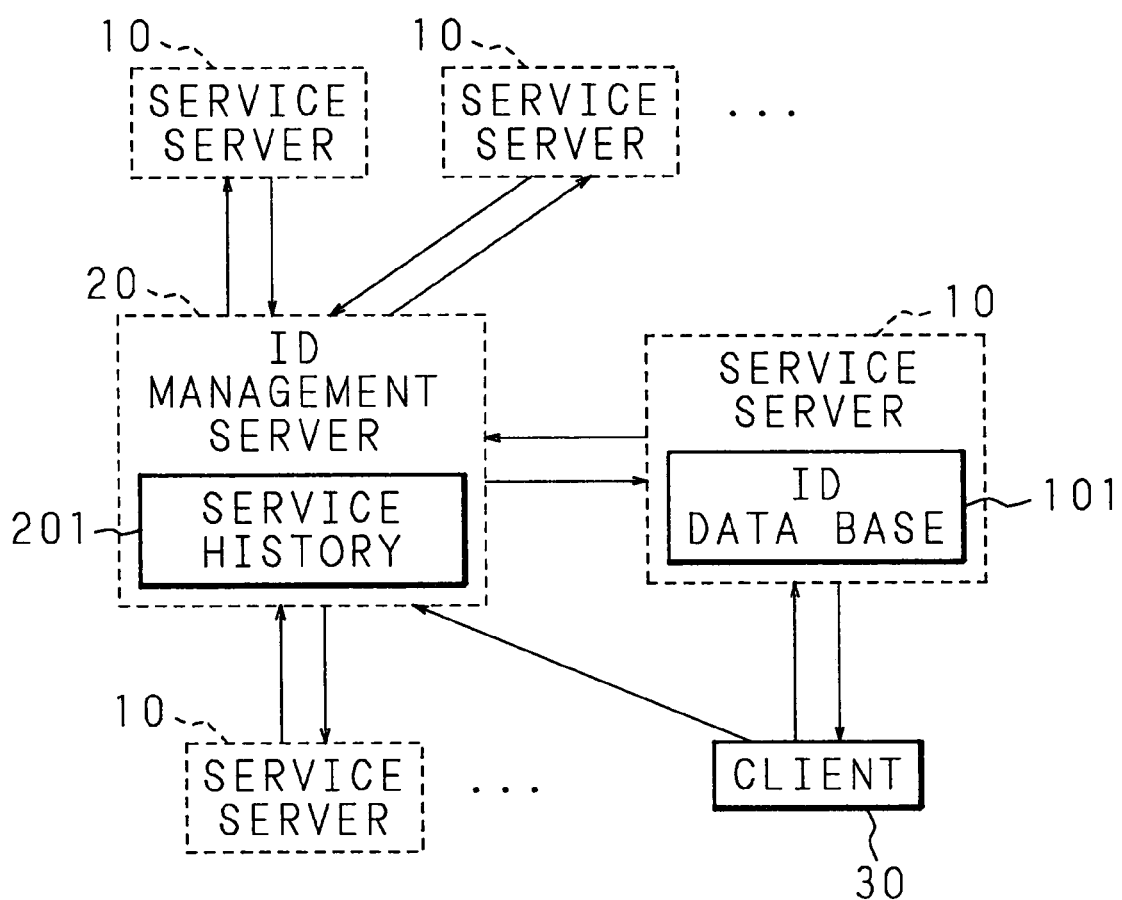
FIG. 3 is a block diagram of Embodiment 2 of the invention.

FIG. 3 is a block diagram of Embodiment 2 of the present invention, wherein the portions that correspond to those of FIG. 2 are indicated by the same marks and their explanations will be omitted. In this embodiment, the service server 10, from which the participation in the information service is requested, queries the ID management server 20, which collectively manages the service history information such as permission/rejection of participation of each ID in the information service of the service history information of the ID from which participation is requested, and according to the service history information, determines the permission/rejection of participation of this ID in the information service.

Accordingly, an ID which has been disqualified from participation in a certain information service cannot obtain qualifications for participation in other information services.

In FIG. 3, the service server 10 is not provided with a behavior record data base 102 as shown in FIG. 2. However, a behavior record data base 102 may be provided, and in the same manner as in the case of Embodiment 1, the behavior of the ID provisionally registered according to the service history information of the ID can be recorded for a certain period to evaluate the behavior, so as to permit/reject official participation in the information service.

By this, better judgment of reliability on the participant is assured.

Figure 11:
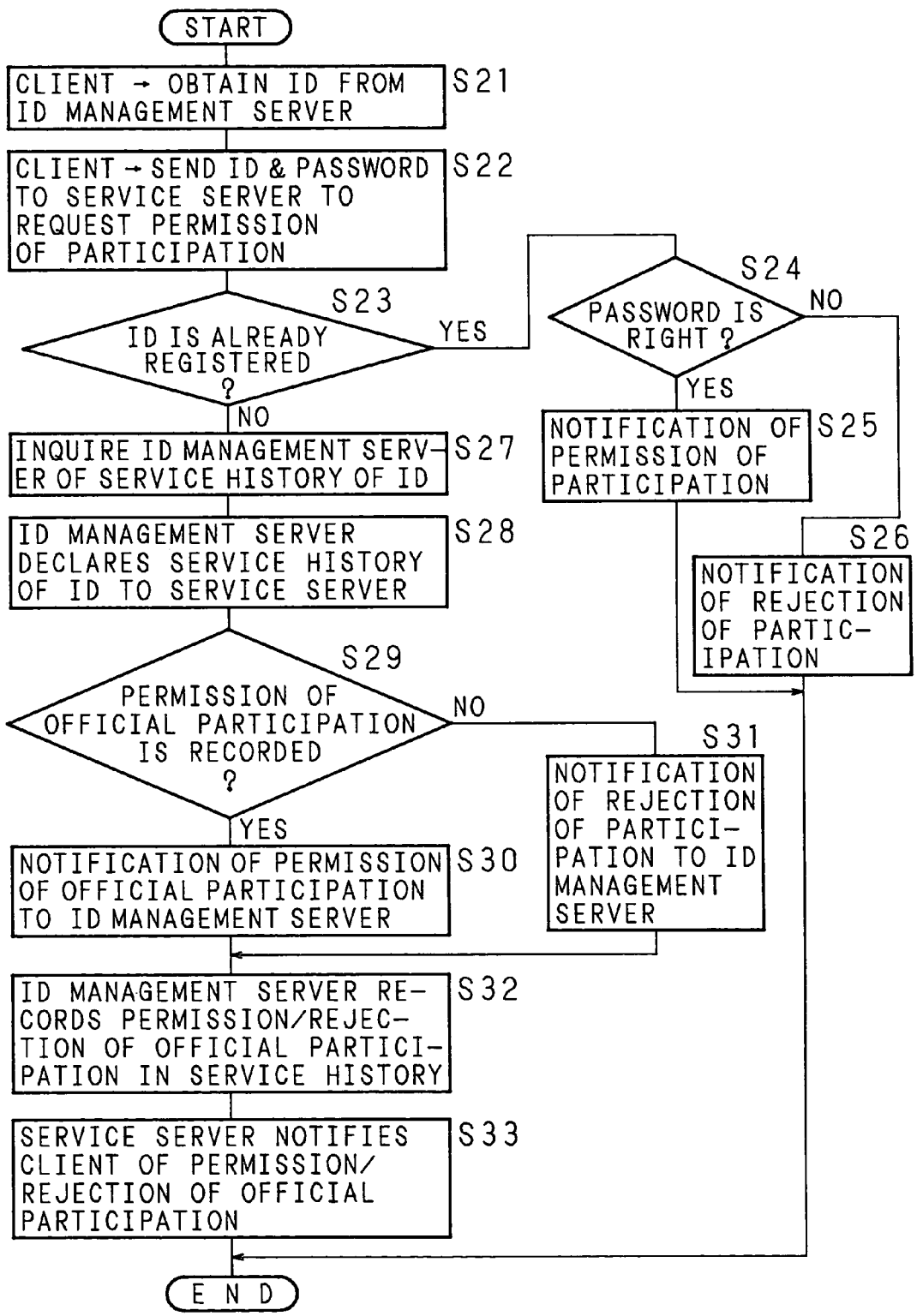
FIG. 11 is a flow chart showing the procedures in Embodiment 2.

Next, the procedures in Embodiment 2 are explained on the basis of the flow chart of FIG. 11. In this embodiment, the service server 10 is a chat server, and client 30 is a chat client.

The participant declares through the client 30 to the ID management server 20 the address, name, electronic mail address, etc., to obtain an ID from the ID management server 20 in advance (Step S21).

The participant sends the ID and password to the service server 10 through the client 30 and requests permission of participation (Step S22). The service server 10 judges whether the ID sent from the client 30 is already registered or not (Step S23), and in case of it being already registered, it judges whether the password is right or not (Step S24). In case the password is right, it notifies the client 30 of permission of participation (Step S25), while on the contrary, in case the password is wrong, it notifies the client 30 of rejection of participation (Step S26) and completes the procedures for permission/rejection of participation.

If the ID is not registered in the ID data base 101, the service server 10 inquires the ID management server 20 of the service history of the ID (Step S27), and the ID management server 20 reports the service history of the ID to the service server 10 (Step S28).

The service server 10 judges whether or not there is a record of permission of official participation in other service server 10 in the service history (Step S29). If there is a record of permission of official participation, it notifies the ID management server 20 of official participation permission (Step S30), while on the contrary in the absence of the record of permission of official participation, it notifies the ID management server 20 of rejection of participation (Step S31).

The ID management server 20 records in the service history 201 the information on permission/rejection of official participation of the ID notified from the service server 10 (Step S32).

Further, the service server 10 notifies the client 30 of permission/rejection of the official participation (Step S33).

Embodiment 3

Publication of Service History of Other Participants

Figure 4:
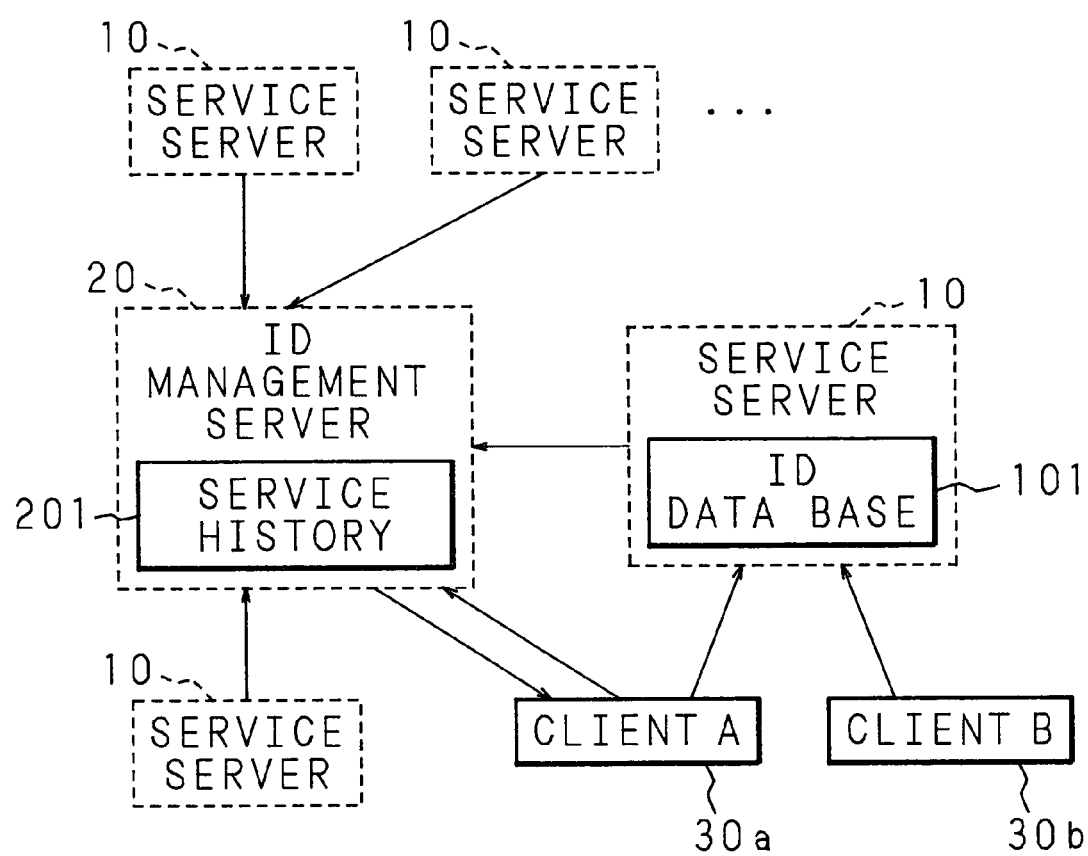
FIG. 4 is a block diagram of Embodiment 3 of the invention.

FIG. 4 is a block diagram of Embodiment 3 of the present invention, wherein the portions same as or corresponding to those of FIG. 2 are indicated by the same marks and their explanations will be omitted. In this embodiment, the participant who requested the participation in the information service to the service server 10 through the client A30a requires the ID management server 20 to browse the service history of another participant participating in the information service through another client B30b, and based on the service history, judges reliability of the other participant. For example, one can judge that the participant having permission of official participation from the information service which one relies on should be reliable.

FIG. 8A is a conceptual view of an example of the service history.

The item of the service history includes serial number of record, service name, recorder, recording date and time, and recording contents (participation permission/participation rejection). Such service history is recorded on each ID.

Figure 12:
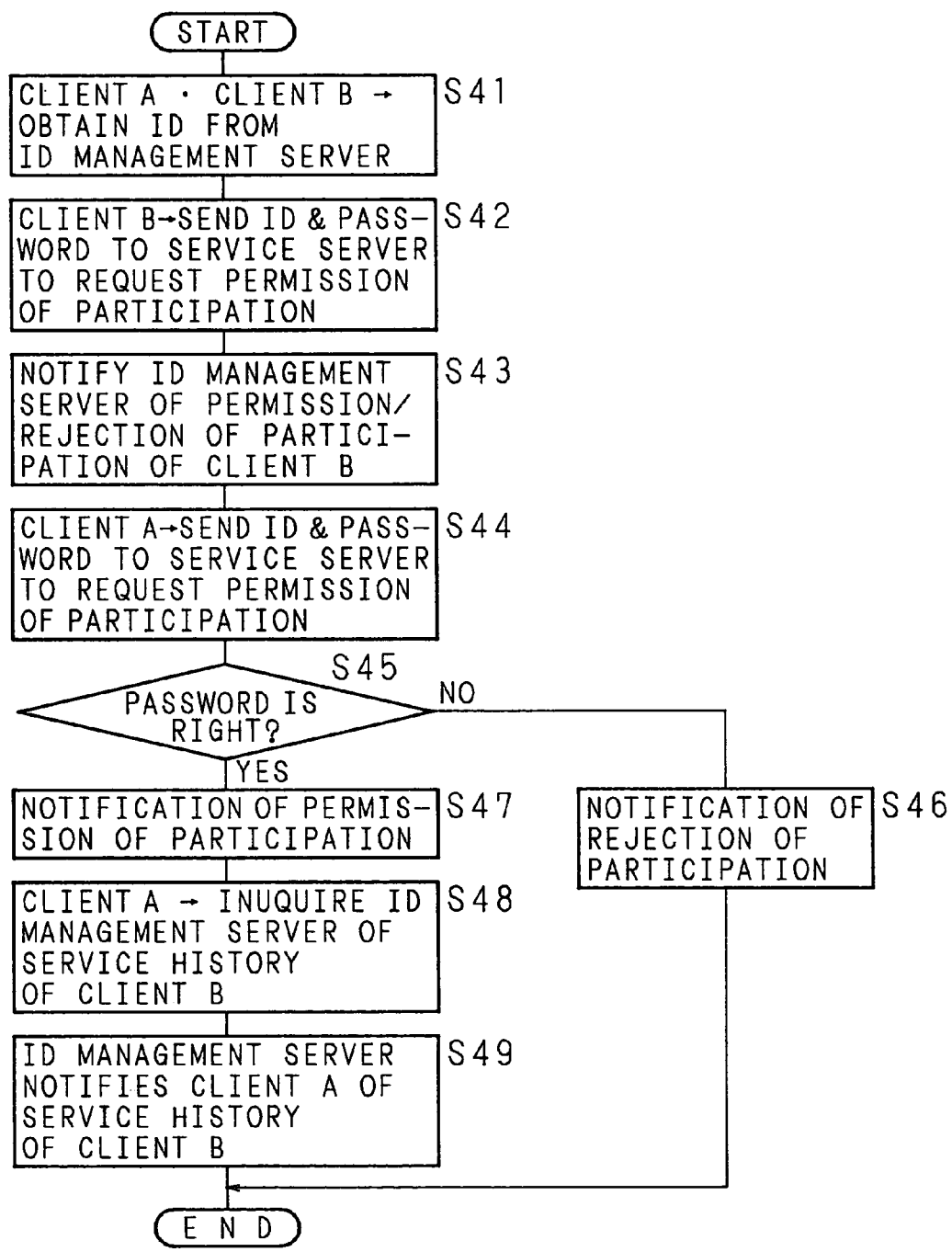
FIG. 12 is a flow chart showing the procedures in Embodiment 3.

Next, the procedures in Embodiment 3 are explained on the basis of the flow chart of FIG. 12. In this embodiment, explanation is made on the case where the service server 10 is a chat server, and the client A30a and client B30b are chat clients.

The participants declare through the client A30a and client B30b respectively to the ID management server 20 the respective addresses, names, electronic mail addresses, etc., to obtain respective IDs from the ID management server 20 in advance (Step S41).

The participant, through the client B30b, sends the service server 10 the ID and password to require permission of participation (Step S42). The service server 10 decides the permission/rejection of participation of the participant through the client B30b by the means as described above, and notifies the ID management server 20 of the permission/rejection of the participation (Step S43). The ID management server 20 records the permission/rejection of the participation of the ID notified from the service server 10 in the service history 201.

The participant, through the client A30a, sends the ID and password to the service server 10 and requests permission of participation (Step S44). The service server 10 does not register the ID sent from the client A30a, if it is already registered in the ID data base 101, and registers if it is unregistered, and judges whether the password sent from the client A30a is right or not (Step S45). In case the password is right, it notifies the client A30a of the permission of participation (Step S47), while on the contrary, in case the password is wrong, it notifies the client A30a of the rejection of participation (Step S46) and completes the procedures for permission/rejection of participation.

In this case, when the participant through the client A30a judges the reliability of the participant in order to realize communication with the same who participates in the same information service through the client B30b, the participant through the client A30a requires the ID management server 20 of the service history of the participant through the client B30b (Step S48). The ID management server 20 notifies the client A30a of the service history of the participant through the client B30b (Step S49).

Figure 5:
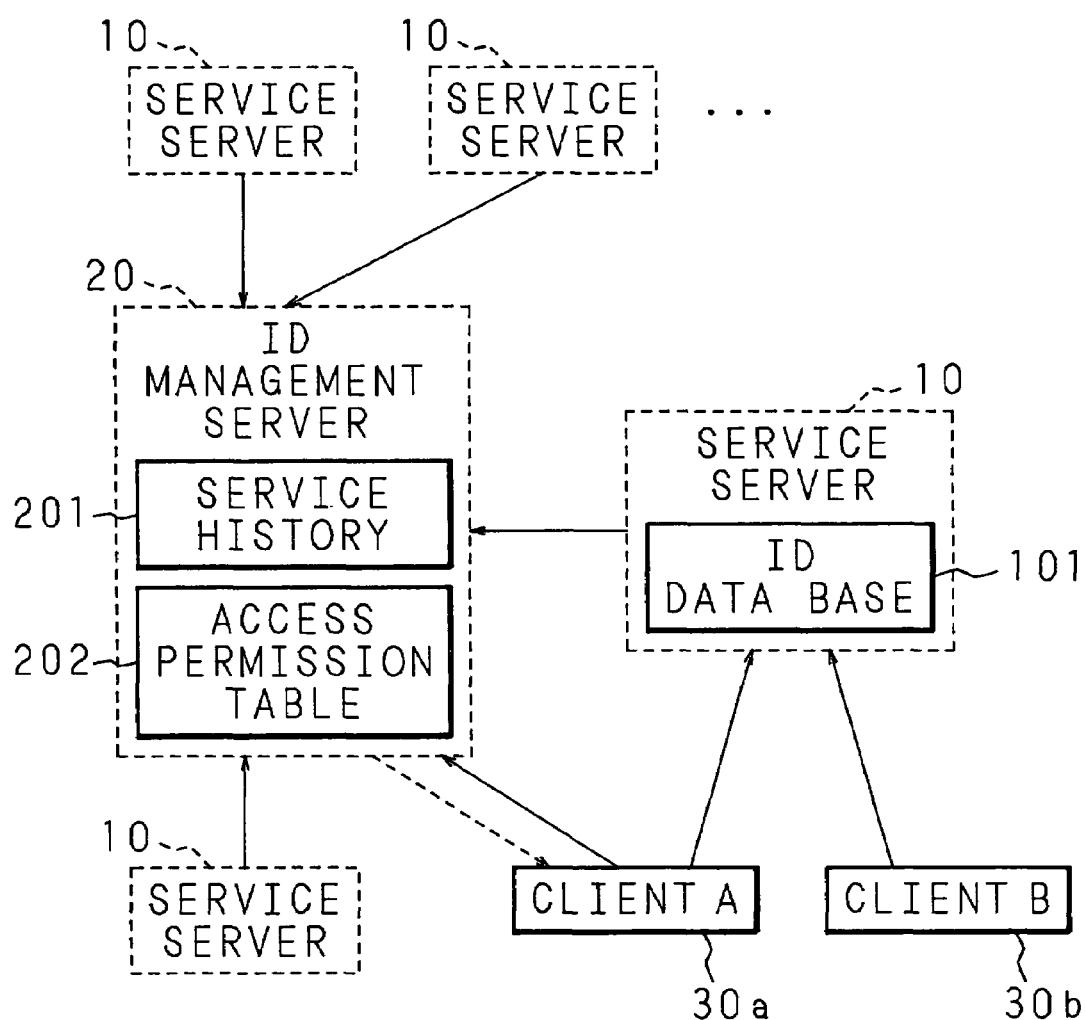
FIG. 5 is a block diagram of a modification of Embodiment 3 of the invention.

FIG. 5 is a block diagram showing a modification of Embodiment 3. In this modification, in addition to Embodiment 3, an access permission table 202 for limiting the scope of publication of the service history is provided on the ID management server 20.

FIG. 8B is a conceptual view of an example of the access permission table.

Each participant can designate the item in the service history as contents of publication, and the ID as the target of publication permission.

Figure 13:
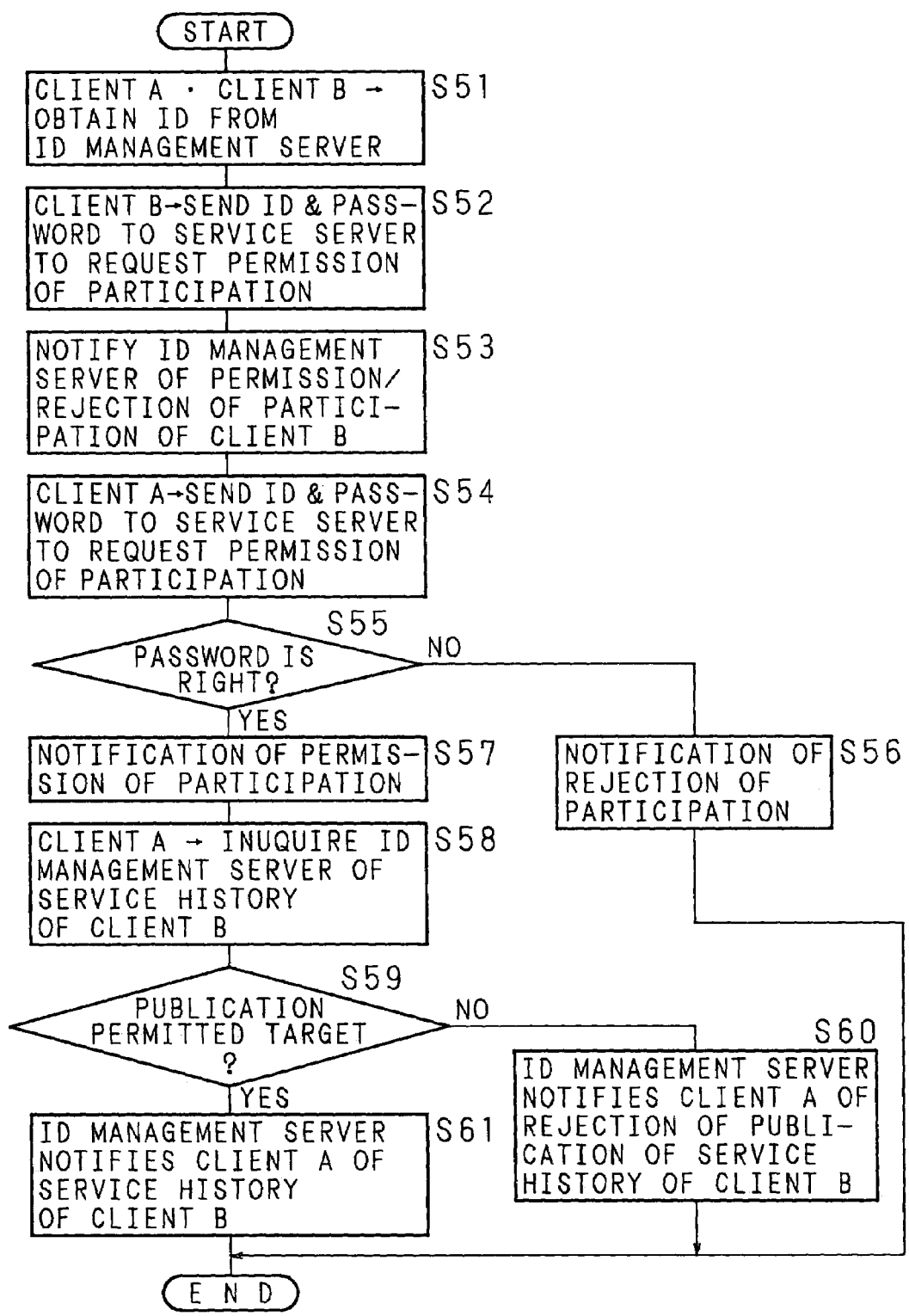
FIG. 13 is a flow chart showing the procedures in the modification of Embodiment 3.

Next, the procedures in the modification of Embodiment 3 are explained on the basis of the flow chart of FIG. 13. Since the steps S51–S58 are same as the steps S41–S48 in FIG. 12, the explanation thereof is omitted.

When the participant through the client A30a requests the ID management server 20 to supply the service history of the participant through the client B30b (Step S48), the ID management server 20 refers to the access permission table 202 and judges whether the ID of the participant through the client A30a is included in the target of permission on publication or not (Step S59). If the ID of the participant through the client A30a is not included in the target of permission on publication, rejection of publication of the service history information of the participant through the client B30b is notified to the client A30a (Step S60). On the other hand, in case of the ID being included in the target of permission on publication, the service history of the participant through the client B30b is notified to the client A30a (Step S61).

Embodiment 4

Publication of Other Participant's Companionship Relation List

Figure 6:
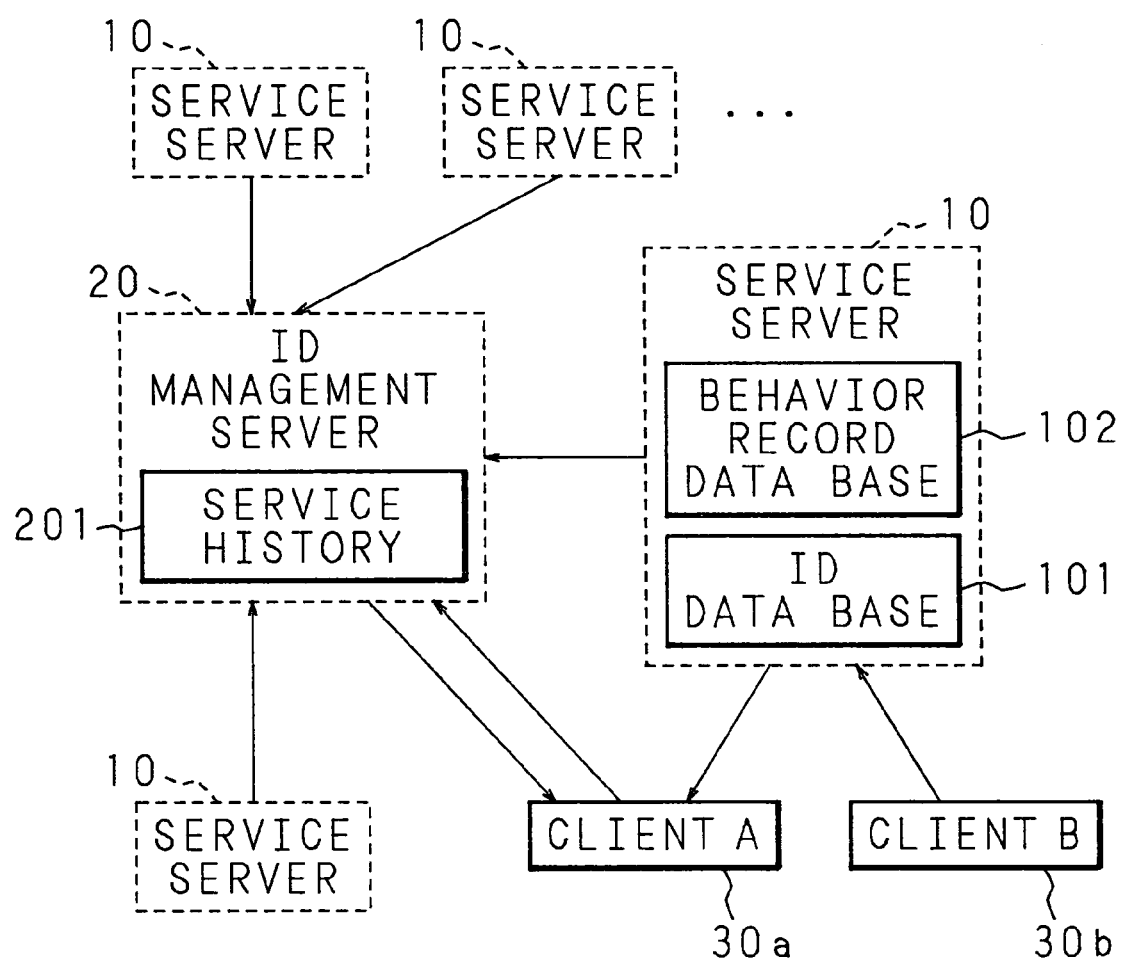
FIG. 6 is a block diagram of Embodiment 4 of the invention.

FIG. 6 is a block diagram of Embodiment 4 of the present invention, wherein the portions corresponding to those of FIG. 2 are indicated by the same marks and their explanations will be omitted. In this embodiment, the participant who requested the participation in the information service to the service server 10 through the client A30a requires the ID management server 20 to browse the information which shows the companionship relation of the participant who participates in the information service through the other client B30b, and based on the companionship relation information judges reliability of the other participant. It can be determined, for example, that the other participant is reliable if the companionship relation information includes an ID of the acquaintance of the individual whose ID the former participant knows.

The companionship relation information as shown in FIG. 9A is recorded in the behavior record data base 102 the time the participant is participating in the information service. For example, when the participant has logged out the information service, the information is notified to the ID management server 20 and recorded in the service history 201.

FIG. 9A is a conceptual view of an example of the participant relation list as the companionship relation information.

In the item of the participant relation list there is included the ID of the companion of communication, acquainted site, and date and time of exchange of electronic calling cards. Such participant relation list is recorded on each ID.

Figure 14:
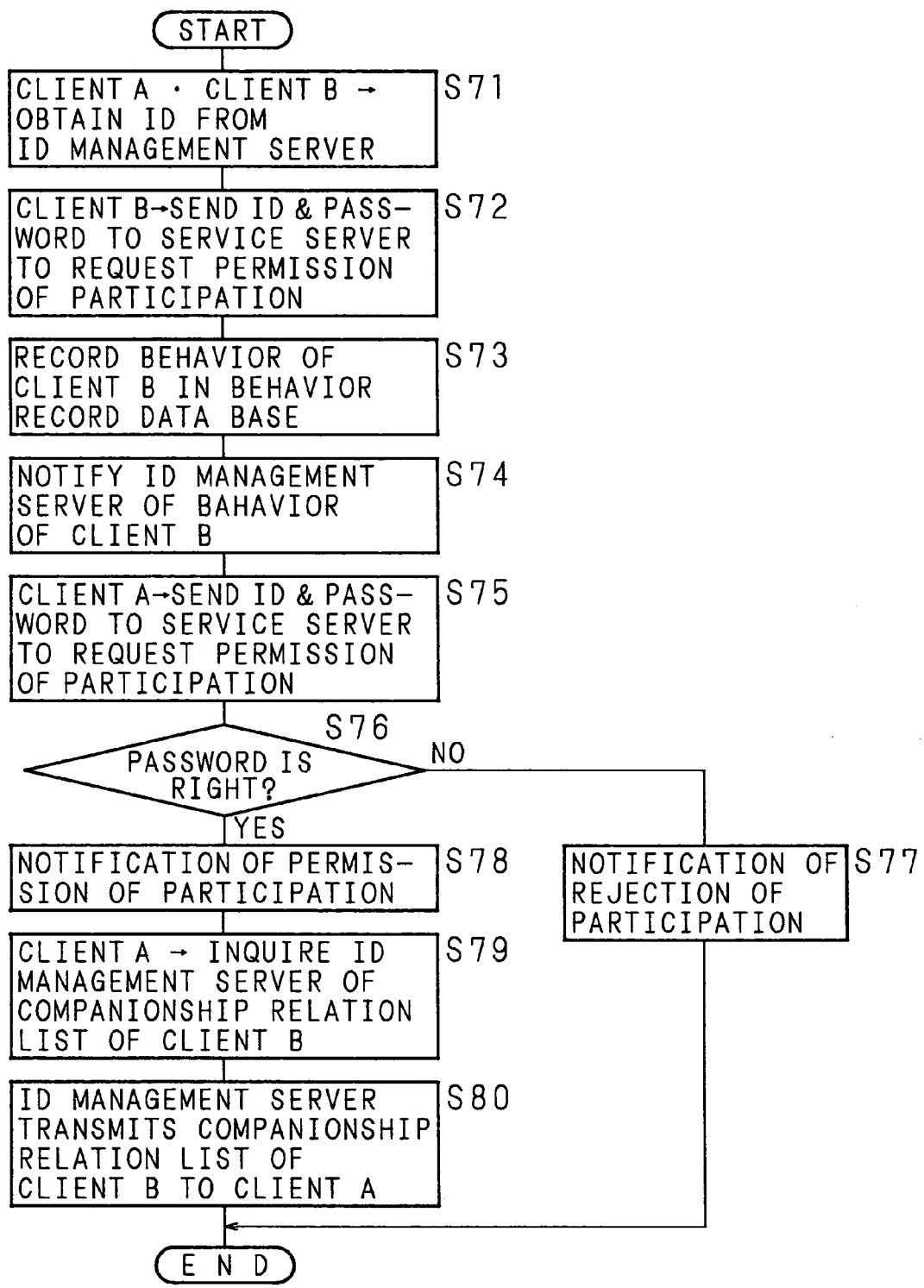
FIG. 14 is a flow chart showing the procedures in Embodiment 4.

Next, the procedures in Embodiment 4 are explained on the basis of FIG. 14. In this embodiment, explanation is made on the case where the service server 10 is a chat server, and the client A30a and client B30b are chat clients.

The participants declare through the client A30a and client B30b respectively to the ID management server 20 the respective addresses, names, electronic mail addresses, etc., to obtain respective IDs from the ID management server 20 in advance (Step S71).

The participant through the client B30b sends the service server 10 the ID and password to require permission of participation (Step S72). The service server 10 decides the permission/rejection of participation of the participant through the client B30b by the means as described above, and, along with the permission/rejection of participation, records in the behavior record data base 102 the information showing the behavior of the companion in the information service (Step S73), the service server 10 notifies the ID management server 20 of the information showing the behavior of the companion along with the information on permission/rejection of participation for example, when this participant is logged out the information service or other cases (Step S74). The ID management server 20 records the permission/rejection of the participant of the ID notified from the service server 10 and the information showing the companion's behavior in the service history 201.

The participant through the client A30a sends the ID and password to the service server 10 and requests permission of participation (Step S75). The service server 10 does not register the ID sent from the client A30a, if it is already registered in the ID data base 101, and registers if it is unregistered, and judges whether the password sent from the client A30a is right or not (Step S76). If the password is wrong, it notifies the client A30a of the rejection of participation (Step S77) and completes the procedures for permission/rejection of participation.

On the other hand, in case the password is right, permission of participation is notified to the client A30a (Step S78). At this time, when the participant through the client A30a judges the reliability of the participant in order to realize communication with the same who participates in the same information service through the client B30b, the participant through the client A30a requires the ID management server 20 of the participant relation list of the participant through the client B30b (Step S79). The ID management server 20 transmits to the client A30a the participant relation list of the participant through the client B30b (Step S80).

Figure 7:
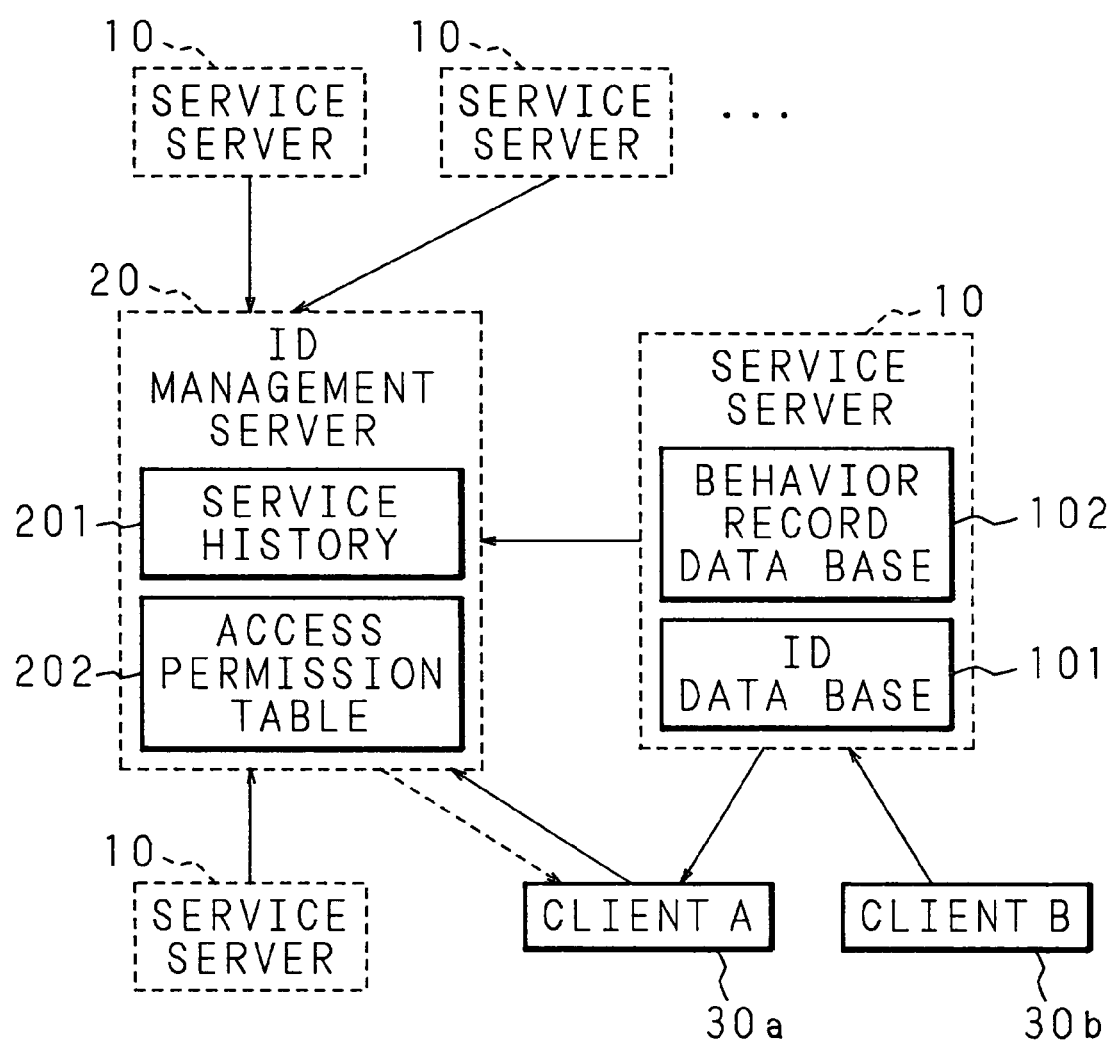
FIG. 7 is a block diagram of a modification of Embodiment 4 of the invention.

FIG. 7 is a block diagram showing a modification of Embodiment 4. In this modification, in addition to Embodiment 4, an access permission table 202 for limiting the scope of publication of the participant relation list is provided on the ID management server 20.

FIG. 9B is a conceptual view of an example of the access permission table.

Each participant can designate the ID of the partner as content for publication, and give permission to publish the ID.

Figure 15:
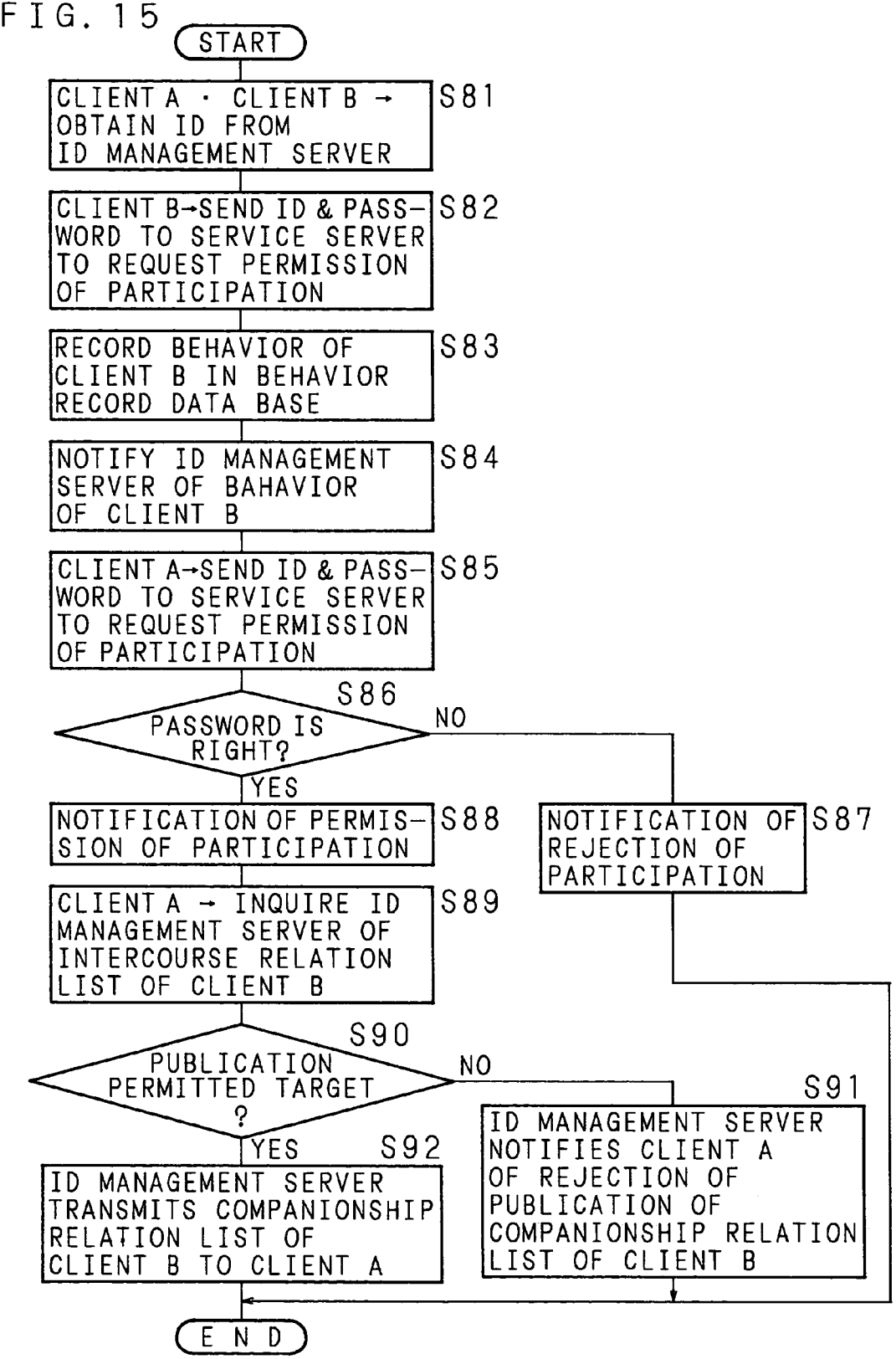
FIG. 15 is a flow chart showing the procedures in the modification of Embodiment 4.

Next, the procedures in the modification of Embodiment 4 are explained on the basis of the flow chart of FIG. 15. Since the steps S81–S89 are same as the steps S71–S79 in FIG. 14, the explanation thereof is omitted.

When the participant through the client A30a requests the ID management server 20 to supply the participant relation list of the participant through the client B30b (Step S89), the ID management server 20 refers to the access permission table 202 and judges whether the ID of the participant through the client A30a is included in the target of permission on publication or not (Step S90). In case that the ID of the participant through the client A30a is not included in the target of permission on publication, rejection of publication of the participant relation list of the participant through the client B30b is notified to the client A30a (Step S91). On the other hand, in case of the ID being included in the target of permission on publication, the participant relation list of the participant through the client B30b is transmitted to the client A30a (Step S92).

Figure 16:
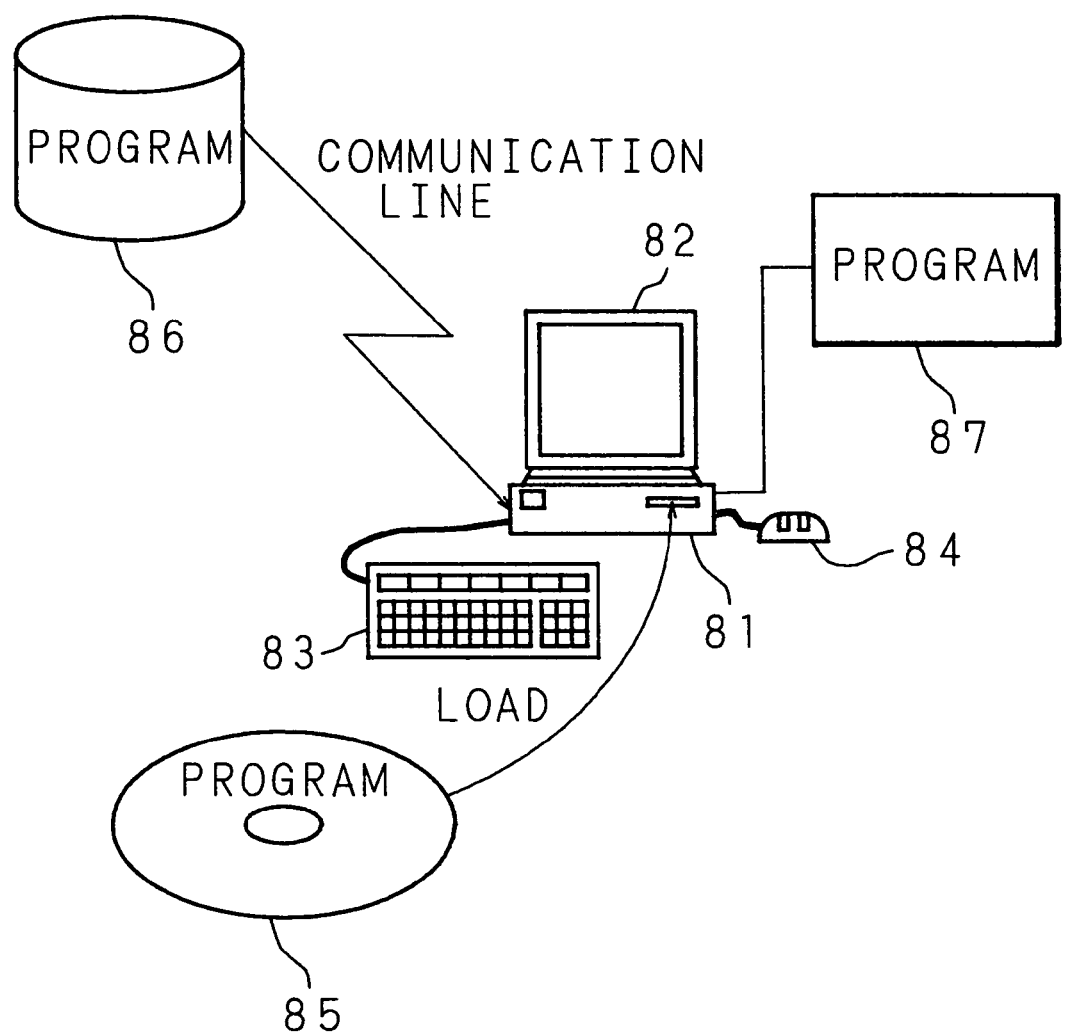
FIG. 16 is a schematic view showing the hardware constitution for realizing the present invention.

FIG. 16 is a schematic view showing the hardware constitution for realizing the present invention. This hardware comprises a personal computer 81 as a processing apparatus, a display 82 for displaying the character data and the like, and a keyboard 83 and a mouse 84 as input apparatus. The personal computer 81 inputs the program for carrying out the processing as described above from the recording medium such as a portable type recording medium 85 including a magnetic disk, CD-ROM, etc., a line memory 86 provided for example in the center with which communication of program can be made in wireless or by cable with the personal computer 81, or a processing apparatus side memory 87 such as a RAM or hard disk provided on the personal computer 81, and the like.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An information service system where an information service providing apparatus and a client apparatus for participating in an information service provided by the information service providing apparatus are connected by network, comprising:

means for transmitting identification information for participating in the information service to the client apparatus in compliance with a request for registration therefrom;

means for storing participation history information including the identification information transmitted to the client apparatus and information on permission/rejection of participation in the information service by the identification information;

means for storing the identification information which is permitted to officially participate in the information service;

means for judging whether the identification information transmitted from the client apparatus for the purpose of making a request for participation in the information service is stored to permit the official participation;

means for notifying the client apparatus of the permission on provisional participation by the identification information in the case where the identification information is not stored to permit the official participation;

means for storing participation behavior information which shows the condition of participation in the information service by the identification information in the predetermined provisional participation period;

means for deciding permission/rejection of official participation in the information service by the identification information based on the participation behavior information; and means for notifying the client apparatus of the permission/rejection of the participation.

2. The information service system of claim 1, further comprising a means for publicizing companionship information of said client apparatus, wherein said means for deciding permission/rejection of official participation uses said companionship information to decide permission/rejection.

3. An information service system where plural information service providing apparatuses and a client apparatus for participating in an information service provided by the information service providing apparatuses are connected by network, comprising:

an information service participation management apparatus which includes means for transmitting identification information for participating in an information service to a client apparatus in compliance with a request for registration therefrom and means for storing participation history information during a provisional participation period including the identification information transmitted to the client apparatus and information on, permission/rejection of participation in the information service by the identification information; and said information service providing apparatus includes means for storing the identification information which is permitted to officially participate in the information service; means for judging whether the identification information transmitted from the client apparatus for the purpose of making a request for participation in the information service is stored to permit the official participation; means for requiring the information service participation management apparatus of the participation history information by the identification information when the identification information is not stored to permit the official participation; means for deciding permission/rejection of participation in the information service by the identification information based on the participation history information received from the information service participation management apparatus; means for notifying the client apparatus of the permission/rejection of the participation; and means for notifying the information service participation management apparatus of the information on permission/rejection of the participation along with the identification information.

4. The information service system according to claim 3, wherein the information service providing apparatus further comprising means for notifying the client apparatus of the permission on provisional participation by the identification information with which the participation history information is received, and means for storing participation behavior information which shows the condition of participation in the information service by the identification information in the predetermined provisional participation period, wherein the means for deciding permission/rejection of participation in the information service is the means for deciding permission/rejection of official participation in the information service by the identification information based on the participation history information and participation behavior information.

5. An information service participation management apparatus for managing participation of a client apparatus in an information service provided by an information service providing apparatus, comprising:
    means for transmitting identification information for participating in the information service to the client apparatus in compliance with a request for registration therefrom;
    means for requesting the information service providing apparatus to transmit participation history information during a provisional participation period including the information on permission/rejection of participation by the identification information in the information service provided by the information service providing apparatus;
    means for storing the identification information transmitted to the client apparatus and the participation history information by the identification information transmitted from the information service providing apparatus;
    means for accepting a request for transmission of the information during the participation in the information service by first identification information; and
    means for transmitting the participation history information by the second identification information to the client apparatus through which the participation in the information service by the first identification information is made.

6. The information service participation management apparatus according to claim 5 further comprising means for storing the identification information to permit the transmission of the participation history information, wherein said means for transmitting the participation history information includes means for permitting the transmission of the participation history information to the client apparatus through which the participation in the information service is made by the first identification information when the first identification information is included in the identification information which is permitted to be transmitted.

7. The apparatus of claim 5, wherein the second identification information is non-personal information.

8. The apparatus of claim 5, wherein a plurality of the information service providing apparatuses provide a plurality of the information services to a single one of the information service participation management apparatuses.

9. The apparatus of claim 8, wherein a user registers with each of the plurality of information services with the first identification information.

10. The apparatus of claim 8, further comprising means for changing the participation history information.

11. An information service participation management apparatus for managing participation of a client apparatus in an information service provided by an information service providing apparatus, comprising:
    means for transmitting identification information for participating in the information service to the client apparatus in compliance with a request for registration therefrom;
    means for requesting the information service providing apparatus to transmit relation information during a provisional participation period to show companionship relation between two of the identification information in the information service provided by the information service providing apparatus;
    means for storing the identification information transmitted to the client apparatus and the relation information of the identification information transmitted from the information service providing apparatus;
    means for accepting a request for transmission of the relation information of second identification information during the information service participation by first identification information; and
    means for transmitting the relation information of the second identification information to the client apparatus through which the participation in the information service participation by the first identification information is made.

12. The information service participation management apparatus according to claim 11 further comprising means for storing the identification information to which the relation information is permitted to be transmitted, wherein said means for transmitting the relation information includes means for permitting the transmission of the relation information to the client apparatus through which the participation in the information service is made by first identification information when the first identification information is included in the stored identification information.

13. An information service providing apparatus for providing an information service for a client apparatus through which participation in the information service is made by identification information which is permitted to participate, comprising:
    means for storing the identification information which is permitted to officially participate in the information service;
    means for judging whether the identification information transmitted from the client apparatus for requesting participation in the information service is stored to permit the official participation;
    means for notifying the client apparatus of the permission on provisional participation by the identification information in case the identification information is not stored to permit the official participation;
    means for storing participation behavior information which shows the condition of participation in the information service by the identification information in the predetermined provisional participation period;

means for deciding permission/rejection of official participation in the information service by the identification information based on the participation behavior information;

means for notifying the client apparatus of the permission/rejection of the participation; and means for notifying an information service participation management apparatus which manages participation in the information service of the information on permission/rejection of the participation along with the identification information.

14. An information service providing apparatus for providing an information service for a client apparatus through which participation in the information service is made by identification information which is permitted to participate, comprising:

means for storing identification information which is permitted to officially participate in the information service;

means for judging whether the identification information transmitted from the client apparatus for requesting participation in the information service is stored to permit the official participation;

means for requesting an information service participation management apparatus which manages participation in the information service of participation history information stored during a provisional participation period by the identification information in the case where the identification information is not stored to permit the official participation;

means for deciding permission/rejection of participation in the information service by the identification information based on the participation history information received from the information service participation management apparatus;

means for notifying the client apparatus of the permission/rejection of the participation; and means for notifying the information service participation management apparatus of the information on permission/rejection of the participation along with the identification information.

15. A recording medium which is readable with an information service participation management apparatus for managing participation of a client apparatus in an information service provided by an information service providing apparatus, said recording medium comprising:

program code means for causing the management apparatus to transmit identification information for participating in the information service to the client apparatus in compliance with a request for registration therefrom;

program code means for causing the management apparatus to request the information service providing apparatus to transmit participation history information during a provisional participation period including the information on permission/rejection of participation by the identification information in the information service provided by the information service providing apparatus;

program code means for causing the management apparatus to store the identification information transmitted to the client apparatus and the participation history information by the identification information transmitted from the information service providing apparatus;

program code means for causing the management apparatus to accept a request for transmission of the participation history information by second identification information during the participation in the information service by first identification information; and program code means for causing the management apparatus to transmit the participation history information by the second identification information to the client apparatus through which the participation in the information service by the first identification information is made.

16. A recording medium which is readable with an information service participation management apparatus for managing participation of a client apparatus in an information service provided by an information service providing apparatus, said recording medium comprising:

program code means for causing the management apparatus to transmit identification information for participating in the information service to the client apparatus in compliance with a request for registration therefrom;

program code means for causing the management apparatus to request the information service providing apparatus to transmit relation information during a provisional participation period to show companionship relation between two of the identification information in the information service provided by the information service providing apparatus;

program code means for causing the management apparatus to store the identification information transmitted to the client apparatus and the relation information of the identification information transmitted from the information service providing apparatus;

program code means for causing the management apparatus to accept a request for transmission of the relation information of second identification information during the information service participation by first identification information; and program code means for causing the management apparatus to transmit the relation information to the client apparatus through which the participation in the information service by the first identification information is made.

17. A recording medium which is readable with an information service providing apparatus for providing an information service for a client apparatus through which participation in the information service is made by identification information which is permitted to participate, said recording medium comprising:

program code means for causing the providing apparatus to store the identification information which is permitted to officially participate in the information service;

program code means for causing the providing apparatus to judge whether the identification information transmitted from the client apparatus for requesting participation in the information service is stored to permit the official participation;

program code means for causing the providing apparatus to notify the client apparatus of the permission on provisional participation by the identification information in case the identification information is not stored to permit the official participation;

program code means for causing the providing apparatus to store participation behavior information which shows the condition of participation in the information service by the identification information in the predetermined provisional participation period;

program code means for causing the providing apparatus to decide permission/rejection of official participation in the information service by the identification information based on the participation behavior information;

program code means for causing the providing apparatus to notify the client apparatus of the permission/rejection of the participation; and program code means for causing the providing apparatus to notify an information service participation management apparatus which manages participation in the information service of the information on permission/rejection of the participation along with the identification information.

18. A recording medium which is readable with an information service providing apparatus for providing an information service for a client apparatus through which participation in the information service is made by the identification information which is permitted to participate, said recording medium comprising:

program code means for causing the providing apparatus to store identification information which is permitted to officially participate in the information service;

program code means for causing the providing apparatus to judge whether the identification information transmitted from the client apparatus for requesting participation in the information service is stored to permit the official participation;

program code means for causing the providing apparatus to request the information service participation management apparatus which manages participation in the information service of participation history information stored during a provisional participation period by the identification information in case the identification information is not stored to permit the official participation;

program code means for causing the providing apparatus to decide permission/rejection of participation in the information service by the identification information based on the participation history information received from the information service participation management apparatus;

program code means for causing the providing apparatus to notify the client apparatus of the permission/rejection of the participation; and program code means for causing the providing apparatus to notify the information service participation management apparatus of the information on permission/rejection of the participation along with the identification information.

19. A method for providing an information service to a client, comprising:

transmitting identification information for participating in the information service to the client in compliance with a request for registration therefrom;

storing participation history information including the identification information transmitted to the client and information on permission or denial of participation in the information service by the identification information;

storing the identification information;

judging whether the identification information is stored or not;

notifying the client of permission for provisional participation in the information service in the case where the identification information is not stored;

storing participation behavior information which shows the client's behavior during the provisional participation;

deciding permission or denial of permanent participation in the information service based upon the participation behavior information; and notifying the client of the permission or denial of the participation.

* * * * *

UNITED STATES PATENT AND TRADEMARK OFFICE
CERTIFICATE OF CORRECTION

PATENT NO. : 7,051,027 B2  Page 1 of 1
APPLICATION NO. : 09/106896
DATED : May 23, 2006
INVENTOR(S) : Kazuki Matsui et al.

It is certified that error appears in the above-identified patent and that said Letters Patent is hereby corrected as shown below:

Column 10  line 55 (claim 3), after "on" delete ",".

Signed and Sealed this

Third Day of October, 2006

JON W. DUDAS
*Director of the United States Patent and Trademark Office*